United States Patent [19]
Baugh

[11] 3,768,774
[45] Oct. 30, 1973

[54] GATE VALVE WITH PRESSURE ACTUATED PLUG SEAT

[75] Inventor: Benton F. Baugh, Houston, Tex.

[73] Assignee: Vetco Offshore Industries, Inc., Ventura, Calif.

[22] Filed: June 16, 1971

[21] Appl. No.: 153,733

[52] U.S. Cl................. 251/175, 251/196, 251/327, 251/329
[51] Int. Cl............................................. F16k 3/18
[58] Field of Search................... 251/175, 193, 196, 251/327, 328, 329, 195; 137/454.2, 454.6

[56] References Cited
UNITED STATES PATENTS

| | | | |
|---|---|---|---|
| 3,194,259 | 7/1965 | Garrod | 137/454.2 |
| 1,871,965 | 8/1932 | DuBois | 251/175 |
| 3,580,542 | 5/1971 | Wright | 251/175 |
| 3,575,377 | 4/1971 | Carlton | 251/175 |
| 3,306,321 | 2/1967 | Bastle | 251/175 |

FOREIGN PATENTS OR APPLICATIONS

| | | | |
|---|---|---|---|
| 234,073 | 4/1969 | U.S.S.R. | 251/175 |

*Primary Examiner*—Harold W. Weakley
*Attorney*—Bernard Kriegel et al.

[57] ABSTRACT

A gate valve including a body having inlet and outlet passages intersected by a cylindrical bore receiving a pair of spaced, opposed seal plates having passages aligned with the other passages, the exterior of the seal plates being cylindrical, conforming to the wall of the cylindrical bore and sealing thereagainst, the inner surfaces of the seal plates being flat and parallel to each other. A gate or carrier located between and slidable along the flat faces has a passage alignable with all of the other passages to produce full opening of the valve, the gate carrying a cylindrical plug seat in a companion cylindrical gate cavity which is slidable with the gate along the flat surfaces across the seal plate passages to close the gate valve, the upstream pressure shifting the plug seat in the gate against the flat surface of the downstream seal plate to provide a metal-to-metal seal thereagainst, supplemented by a seal ring on the plug seat sealing against the gate and the downstream seal plate.

12 Claims, 6 Drawing Figures

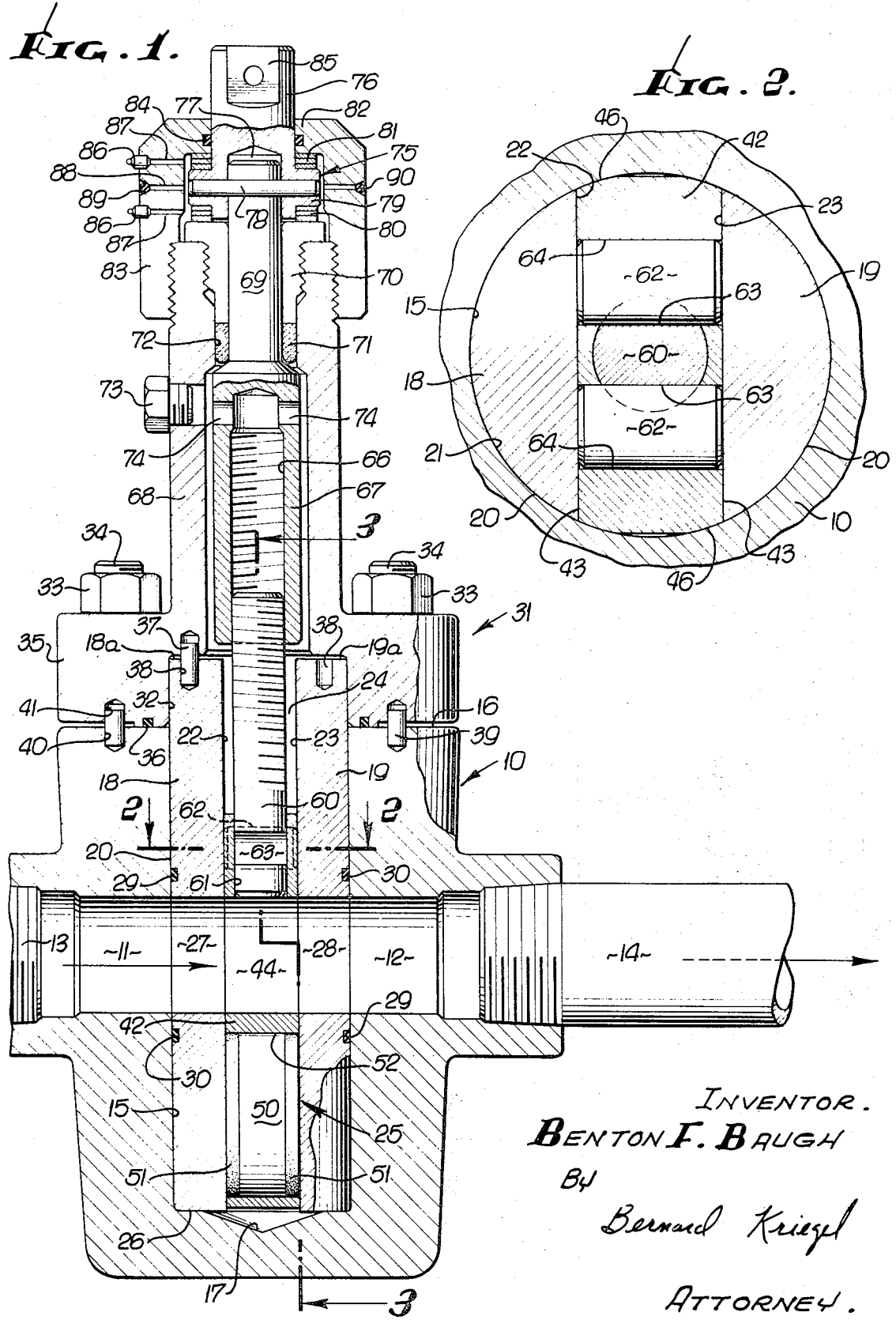

Patented Oct. 30, 1973

INVENTOR.
BENTON F. BAUGH
BY Bernard Kriegel
ATTORNEY.

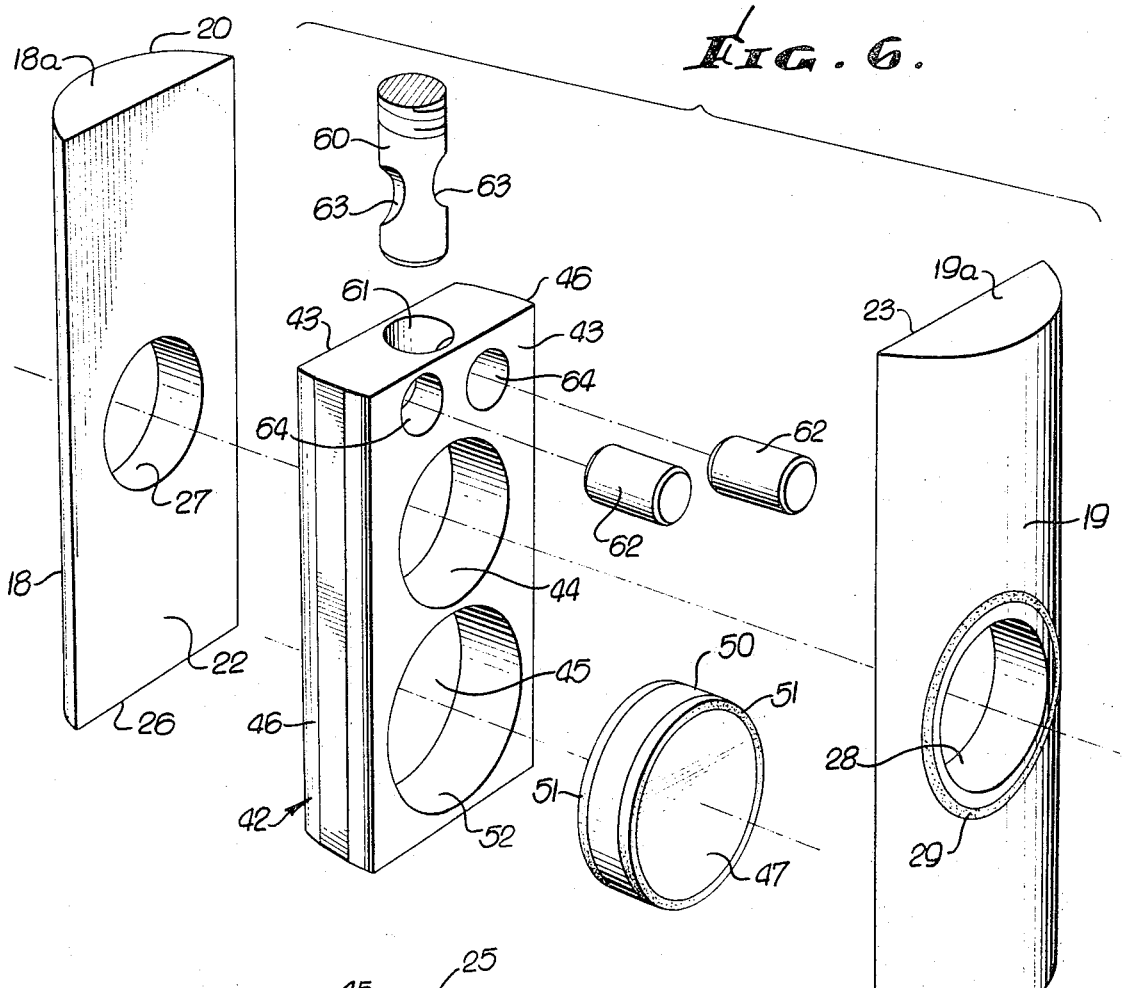
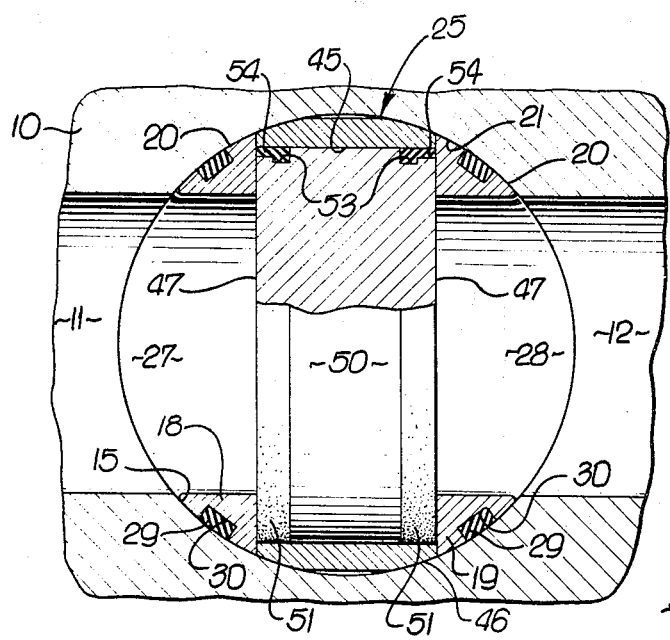

GATE VALVE WITH PRESSURE ACTUATED PLUG SEAT

The present invention relates to valve devices, and more particularly to gate valves.

Prior gate valves have been comparatively costly to manufacture, requiring special machinery to produce the gate and cavity in the valve body, such as broaching or anocutting equipment. Moreover, the gate, which is shiftable in the valve body between valve opening and closing positions, tend to cock slightly, preventing its floating movement by the upstream fluid pressure fully against the downstream seal surface, thereby forestalling the securing of a desirable metal-to-metal seal. The cocking tendency may be overcome by undertaking specific manipulative steps in operating the valve, or by providing precisely positioned stops limiting movement of the gate in both valve opening and valve closing directions. The prior gate valves have the further disadvantage of embodying expendable parts which are relatively costly to manufacture.

By virtue of the present invention, gate valves are provided which are materially less costly to manufacture, requiring no specialized machinery or equipment. Expendable parts are not threaded, as in prior valve devices, and are, therefore, less costly to produce. An effective metal-to-metal seal is secured between a gate structure and a seal plate without the need for special valve manipulations and precise locations of limit stops. A plug seat, forming part of the gate structure, is floatingly carried by the gate and can move relative thereto into flat, metal-to-metal sealing engagement with a companion member, the metal-to-metal seal being backed up or supplemented by a resilient seal, thereby insuring against valve leakage.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a vertical section through a gate valve embodying the invention;

FIG. 2 is an enlarged cross-section taken along the line 2—2 on FIG. 1;

FIG. 5 is an enlarged section taken along the line 5—5 on FIG. 4; and

FIG. 6 is an exploded view of portions of the gate valve.

Figure 4:
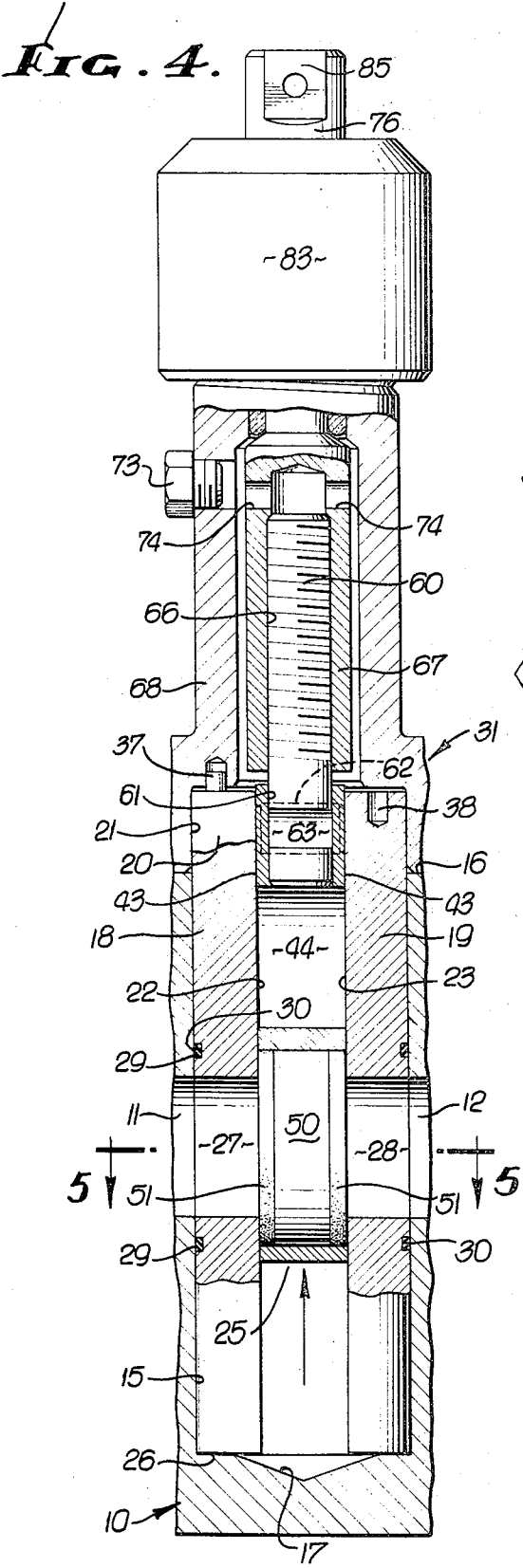
FIG. 4 is a view similar to FIG. 1 illustrating the gate valve in a closed position.
Figure 3:
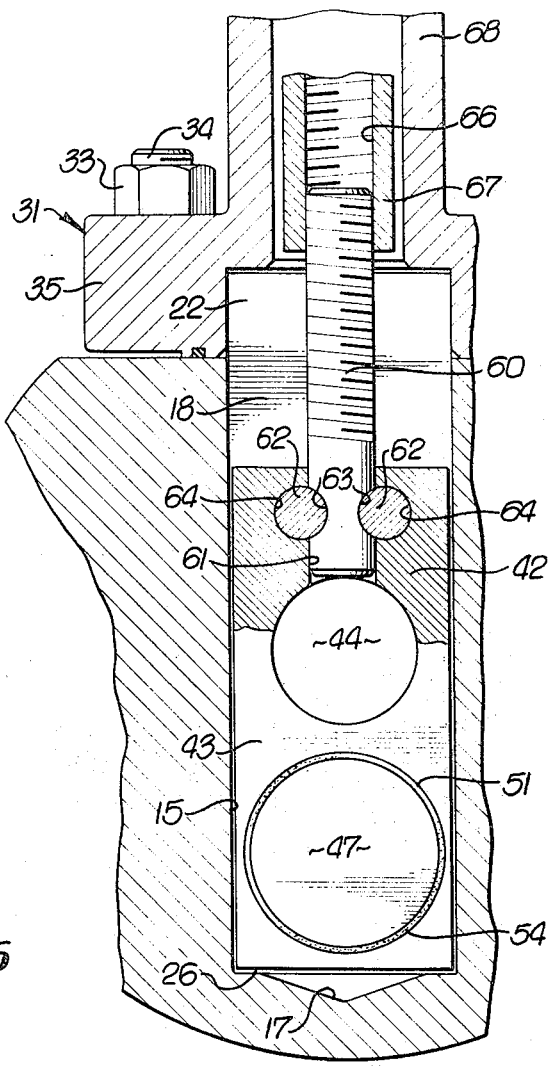
FIG. 3 is a vertical section taken along the line 3—3 on FIG. 1, parts being disclosed in elevation.

The gate valve illustrated in the drawings includes a main valve body 10 having aligned inlet and outlet passages 11, 12, fluid from an inlet pipe 13 being threadedly connected to the body and communicating with the inlet passage, while fluid in the outlet passage 12 flows into an outlet pipe 14 threadedly connected to the body. The body has a cylindrical bore 15 formed therein, as by drilling, which is normal to the inlet and outlet passages 11, 12, this bore extending from the upper end 16 of the body 10 and being closed at its lower end 17 by the valve body itself. Disposed within the cylindrical bore are a pair of opposed seal plates 18, 19 having external or outer cylindrical surfaces 20 conforming to and engaging the wall 21 of the cylindrical bore 15, and flat parallel inner surfaces 22, 23 separated from one another to provide a space 24 receiving a gate structure 25. The lower ends 26 of the seal plates 18, 19 bear against the bottom of the cylindrical bore 15, their upper ends 18a, 19a projecting a short distance above the upper end 16 of the main valve body 10. The seal plates have passages 27, 28 of substantially the same diameters as, and aligned with, the inlet and outlet body passages 11, 12, leakage of fluid along the cylindrical exteriors of each seal plate being prevented by an elastomer seal ring 29 in a groove 30 in the cylindrical surface of each seal plate, circumscribing the seal plate passage 27 or 28, and which engages the companion cylindrical wall 21 of the bore 15 in surrounding relation to an adjacent body passage 11 or 12. The cylindrical surface 20 of a seal plate and the seal ring 29 surrounding its passage are disclosed most clearly in FIG. 6.

The seal plates 18, 19 are secured in a fixed position in the main valve body 10 by a body bonnet 31 having a bore 32 receiving the upper ends 18a, 19a of the seal plates, the wall of the bore having substantially the same diameter as the cylindrical surfaces 20 of the seal plates. The bonnet is firmly secured to the main valve body by a plurality of nuts 33 threaded on studs 34 extending through the lower bonnet flange 35 and secured to the main valve body 10, a suitable gasket or seal ring 36 in the bonnet engaging the upper end 16 of the valve body to prevent leakage therebetween. The seal plates 18, 19 are properly oriented within the valve body 10 to insure proper alignment of their passages 27, 28 with the inlet and outlet passages 11, 12 by a pin 37 secured to the bonnet and being placed selectively in one of a plurality of circumferentially disposed sockets 38 in the upper end portions of the seal plates, the bonnet 31 itself being prevented from turning relative to the main valve body 10 by circumferentially spaced pins 39 secured in sockets 40 in the upper portion of the valve body and extending into opposed companion sockets 41 in the bonnet.

The gate structure 25 includes a gate 42 having opposed flat parallel sides 43, 43 spaced from one another a distance conforming to the spacing between the inner flat sides 22, 23 on the seal plates 18, 19 and is shiftable from a valve opening position in which a gate passage 44, conforming to the other passages 27, 28, in aligned therewith, in which the valve is fully open, to a position in which a portion of the gate structure obstructs the passages 27, 28 to close the valve. Thus, the gate structure includes a generally cylindrical plug seat 50 mounted within a cylindrical bore 45 extending through the gate 42, the axis of the bore and of the plug seat being parallel to the passages 11, 12, 27, 28 through the main valve body 10 and seal plates 18, 19. The overall thickness or axial extent of the plug seat 44 is the same as the thickness of the gate 42, the gate itself having oppositely directed cylindrical convex surfaces 46 conforming to the wall 21 of the cylindrical body bore 15 and slidable therealong. The flat ends 47 of the plug seat 50 are spaced from one another a distance substantially equal to the distance between the inner flat sides 22, 23 of the seal plates 18, 19, the diameter of the plug seat being substantially greater than the diameter of the aligned passages 27, 28 through the seal plates so that the plug seat can fully bridge the seal plate passages with the outer marginal portions of the plug seat engaging the flat sides 22, 23 of the seal plates 18, 19, for the purpose of forming a metal-to-metal seal thereagainst.

As assurance against leakage between the plug seat 50 and the gate 42, the plug seat carries circular elastomer seal rings 51 in its periphery that sealingly engage against the wall 52 of the cylindrical bore 45 of the gate. As disclosed, end seal rings 51 are mounted in peripheral grooves 53 in the plug seat, the seal rings having skirt portions 54 projecting in opposite directions from each other which engage the cylindrical wall 52 of the gate bore, each skirt terminating at the adjacent flat surface 47 of the plug seat and being adapted to contact the flat side 22 or 23 of an adjacent seal plate. Thus, the seal rings 51 prevent leakage of fluid between the plug seat 50 and the cylindrical wall 52 of the gate in both directions, and they also seal against the flat surfaces 22, 23 of the seal plates 18, 19.

A rising valve stem 60 is secured to the gate 42 for the purpose of shifting the latter transversely of the passages 27, 28, thereby moving the gate and its plug seat 50 between valve opening and valve closing positions. The stem section 60 is coupled to the gate by disposing the stem within a bore 61 in the gate that opens through its upper end and inserting pins 62 on opposite sides of the stem transversely across the stem, each pin being received within a cylindrical recess 63 in the stem and an opposed cylindrical recess 64 in the gate 42. Thus, in connecting the stem section 60 to the gate, the stem need only be moved into the bore 61 of the gate, with its cylindrical recesses 63 confronting the cylindrical recesses 64 in the gate, whereupon the connector pins 62 are inserted into the confronting recesses. The pins 62 have a length corresponding to the thickness of the gate 42 and cannot become dislodged when the gate is inserted between the seal plates 18, 19, since they are retained in position by the flat sides 22, 23 of the seal plates.

The stem 60, gate 42 and plug seat 50 are shiftable in a transverse direction with respect to the valve body and seal plate passages 11, 12, 27, 28 in any suitable manner. As disclosed, the shifting action is performed mechanically. The rising stem section 60 is externally threaded and is threadedly received within an internally threaded bore 66 in a rotatable stem section 67 disposed within an upper portion or skirt 68 of the bonnet, a cylindrical reduced diameter rotatable stem portion 69 extending through a packing gland 70 threaded into the upper end of the bonnet skirt and terminating thereabove. The inner end of the packing gland abuts a stem packing 71 surrounding and sealingly engaging the upper stem portion 69, as well as the inner wall 72 of the bonnet, to prevent fluid leakage along the stem. A suitable lubricant can be forced into the bonnet through a grease fitting 73 threaded thereinto, this lubricant being capable of passing through ports 74 in the rotatable stem section into the threaded bore 66.

Axial movement of the rotatable stem section 67 is prevented by a thrust bearing assembly 75 mounted at the upper end of the bonnet. Thus, an upper stem section 76 has an inner bore 77 in which the upper end of the cylindrical stem portion 69 is inserted, the stem sections 76, 67 being secured together by an overload pin 78 extending transversely therethrough. The upper stem section includes a flange 79, the inner surface of which engages an inner thrust bearing 80, contacting the upper end of the packing gland 70, the outer surface of the flange engaging an outer thrust bearing 81 that engages an inwardly directed flange 82 of a cap 83 threadedly secured on the upper end of the bonnet skirt 68. Leakage of fluid between the cap and the upper stem section is prevented by a suitable seal ring 84 mounted in the flange 82 of the cap and sealing against the upper stem section 76. It is, therefore, apparent that rotation of the upper stem section 76 in either direction will be transmitted through the overload pin 78 to the inner stem section 67. The required rotary effort can be secured from a suitable wrench (not shown) placed against the flats 85 provided on the upper stem section 76.

The bearings 80, 81 can be lubricated through grease fittings 86 mounted in the cap 83 and communicating with passages 87 extending to the upper and lower bearings. Excess lubricant can pass from the end cap through a suitable bent passage 88 communicating with a peripheral groove 89 in the exterior of the cap, a suitable elastomer ring 90 being disposed in this groove which will permit outward passage of lubricant from the vent passage 88, but which will engage the base of the peripheral groove 89 to preclude reverse flow of fluid through the passage.

As disclosed in FIG. 1, the gate valve is in an open position, the gate passage 44 being aligned with the seal plate and body passages 27, 28, 11, 12. The threaded connection between the rotatable and rising stem sections 67, 60 may be of any suitable hand. As disclosed, a left-hand threaded arrangement is provided. Accordingly, application of a wrench to the wrench flats 85 and rotation of the stem sections 76, 67 to the left will cause the inner stem section 60 to move upwardly within the bonnet 31 and shift the gate valve structure 25 upwardly along the seal plates 18, 19, until the plug seat 50 is disposed fully across the seal plate passages 27, 28, as disclosed in FIGS. 4 and 5. The plug seat 50 can be forced by the upstream fluid pressure in a downstream direction within the cylindrical bore 45 of the gate into metal-to-metal sealing contact with the flat surface 23 of the downstream seal plate 19, fully closing its seal passage 28. This metal-to-metal seal is supplemented by the engagement of the downstream elastomer seal 51 with the flat surface 23 of the downstream seal plate. The upstream elastomer seal 51 will be retained by the upstream fluid pressure in leakproof sealing engagement with the wall 52 of the cylindrical bore 45 through the gate 42. Fluid pressure cannot leak between the seal plates 18, 19 and the cylindrical wall 21 of the valve body bore 15 because of the sealing engagement of the seal rings 29 on the seal plates therewith.

Rotation of the upper stem section 76 and rotatable stem section 67 in the opposite or right direction will shift the gate structure 25, including its movable plug seat 50, in the opposite direction, returning such structure to the full valve opening position disclosed in FIG. 1.

Because of the gate valve arrangement illustrated and described, it can be manufactured at less cost than prior gate valves. The gate cavity 15 is a round or cylindrical bored hole. It does not require casting, broaching or anocutting with the special machinery and equipment required to perform such operations. Cocking of the gate 42 will not affect the full metal-to-metal seal between the plug seat 50 and the downstream face 23 of the seal plate, since the plug seat is floating in the gate 42 and can shift relative to the gate into proper engagement with the seal plate 19. Special stops and manipulations are unnecessary in securing the proper and full closing of the gate valve, as well as its full opening. Although the metal-to-metal seal between the plug seat 50 and the seal plate 19 will prevent leakage, the elastomer or resilient seal 51 is still available for preventing leakage, supplementing the metal-to-metal seal. In the event that the valve becomes defective in its operation, the plug seat 50 is a relatively inexpensive part to replace. For that matter, if the gate 42 requires replacement, its cost is less than prior gates, since it does not embody a threaded portion and is, therefore, more economical to produce.

I claim:

1. In a valve: a body having an inlet passage, an outlet passage, and a substantially cylindrical bore extending across said passages; opposed individual separate segment seal plates removably disposed in said bore and having external cylindrical surfaces conforming to and engaging the cylindrical wall of said bore, said plates having confronting flat inner upstream and downstream surfaces spaced from and parallel to one another, said plates having inlet and outlet passages, respectively; means for retaining said plates in their respective positions in said bore; a gate structure including a gate between said seal plates and having opposed flat surfaces slidable along said confronting flat inner surfaces, said gate having a flow passage communicable with said plate passages when said structure is in a first position between said plates, said gate further having a cylindrical gate bore paralleling said flow passage; a generally cylindrical one piece plug seat slidably mounted in said gate bore and having opposed flat parallel upstream and downstream surfaces, said plug seat being subject to fluid pressure in said inlet passages acting upon said upstream seat surface to force said downstream seat surface into sealing engagement against said downstream plate surface when said surface occupies a second position between said plates with said plug seat extending across said plate inlet and outlet passages to prevent fluid flow therebetween; and means for shifting said gate structure between said first and second positions.

2. In a valve as defined in claim 1; said gate having cylindrical surfaces conforming to and slidable along the cylindrical wall of said body bore between said segment seal plates.

3. In a valve as defined in claim 1; and seal means on said plug seat surrounding said plate outlet and engageable with said downstream flat surface to supplement the sealing engagement of said plug seat surface against said downstream flat surface when said structure occupies said second position.

4. In a valve as defined in claim 1; said gate having cylindrical surfaces conforming to and slidable along the cylindrical wall of said body bore between said segment seal plates; and seal means on said plug seat surrounding said plate outlet and engageable with said downstream flat surface to supplement the sealing engagement of said plug seat surface against said downstream flat surface when said structure occupies said second position.

5. In a valve as defined in claim 1; and a seal ring on said plug seat sealingly engaging the wall of said cylindrical gate bore and surrounding said plate outlet and engageable with said downstream flat surface surface to supplement the sealing engagement of said plug seat surface against said downstream flat surface when said structure occupies said second position.

6. In a valve: a body having an inlet passage, an outlet passage, and a substantially cylindrical bore extending across said passages; opposed individual segment seal plates removably disposed in said bore and having external cylindrical surfaces conforming to and engaging the cylindrical wall of said bore, said plates having confronting flat inner upstream and downstream surfaces spaced from and parallel to one another, said plates having inlet and outlet passages communicating with said body inlet and outlet passages, respectively; a gate structure including a gate between said seal plates and having opposed flat surfaces slidable along said confronting flat inner surfaces, said gate having a flow passage communicable with said plate passages when said structure is in a first position between said plates, said gate further having a cylindrical gate bore paralleling said flow passage; a generally cylindrical plug seat slidably mounted in said gate bore and having opposed flat parallel upstream and downstream surfaces, said plug seat being subject to fluid pressure in said inlet passages acting upon said upstream seat surface to force said downstream seat surface into sealing engagement against said downstream plate surface when said structure occupies a second position between said plates with said plug seat extending across said plate inlet and outlet passages to prevent fluid flow therebetween; and means for shifting said gate structure between said first and second positions; and seal means on said plug seat surrounding said plate outlet and engageable with said downstream flat surface to supplement the sealing engagement of said plug seat surface against said downstream flat surface when said structure occupies said second position; and a seal ring on said plug seat adjacent said upstream seat surface and engageable with the wall of said cylindrical gate bore to prevent leakage of fluid from said inlet passages around said plug seat.

7. In a valve as defined in claim 1; and a seal ring on said plug seat sealingly engaging the wall of said cylindrical gate bore and surrounding said plate outlet and engageable with said downstream flat surface to supplement the sealing engagement of said plug seat surface against said downstream flat surface when said structure occupies said second position; said gate having cylindrical surfaces conforming to and slidable along the cylindrical wall of said body bore between said segment seal plates.

8. In a valve as defined in claim 1; and seal means on the exteriors of said seal plates surrounding said inlet passages and outlet passages and sealingly engaging the cylindrical wall of said body bore.

9. In a valve as defined in claim 1; said gate having cylindrical surfaces conforming to and slidable along the cylindrical wall of said body bore between said segment seal plates; and seal means on the exteriors of said seal plates surrounding said inlet passages and outlet passages and sealingly engaging the cylindrical wall of said body bore.

10. In a valve: a body having an inlet passage, an outlet passage, and a substantially cylindrical bore extending across said passages; opposed individual segment seal plates removably disposed in said bore and having external cylindrical surfaces conforming to and engaging the cylindrical wall of said bore, said plates having confronting flat inner upstream and downstream surfaces spaced from and parallel to one another, said plates having inlet and outlet passages communicating with said body inlet and outlet passages, respectively; a gate structure including a gate between said seal plates and having opposed flat surfaces slidable along said confronting flat inner surfaces, said gate having a flow passage communicable with said plate passages when said structure is in a first position between said plates, said gate further having a cylindrical gate bore paralleling said flow passage; a generally cylindrical plug seat slidably mounted in said gate bore and having opposed flat parallel upstream and downstream surfaces, said plug seat being subject to fluid pressure in said inlet passages acting upon said upstream seat surface to force said downstream seat surface into sealing engagement against said downstream plate surface when said structure occupies a second position between said plates with said plug seat extending across said plate inlet and outlet passages to prevent fluid flow therebetween; and means for shifting said gate structure between said first and second positions; and a seal ring on said plug seat sealingly engaging the wall of said cylindrical gate bore and surrounding said plate outlet and engageable with said downstream flat surface to supplement the sealing engagement of said plug seat surface against said downstream flat surface when said structure occupies said second position; and a seal ring on said plug seat adjacent said upstream seat surface and engageable with the wall of said cylindrical gate bore to prevent leakage of fluid from said inlet passages around said plug seat.

11. In a valve as defined in claim 10; said gate having cylindrical surfaces conforming to and slidable along the cylindrical wall of said body bore between said segment seal plates.

12. In a valve as defined in claim 10; and seal means on the exteriors of said seal plates surrounding said inlet passages and outlet passages and sealingly engaging the cylindrical wall of said body bore.

* * * * *

PO-1050
(5/69)

UNITED STATES PATENT OFFICE
CERTIFICATE OF CORRECTION

Patent No. 3,768,774     Dated October 30, 1973

Inventor(s) BENTON F. BAUGH

It is certified that error appears in the above-identified patent and that said Letters Patent are hereby corrected as shown below:

Column 1, line 11: "tend" should be --tends--.

Column 4, line 21: "bent" should be --vent--.

Column 5, line 27: after "having" insert --inlet and outlet passages communicating with said body--.

line 43: cancel "surface" (second occurrence) and substitute --structure--.

Column 6, line 4: cancel "surface" (last occurrence).

Signed and sealed this 23rd day of April 1974.

(SEAL)
Attest:

EDWARD M. FLETCHER, JR.
Attesting Officer

C. MARSHALL DANN
Commissioner of Patents